(12) United States Patent
Muco et al.

(10) Patent No.: US 11,686,410 B2
(45) Date of Patent: Jun. 27, 2023

(54) RUBBER COMPOSITION FOR A COVER LAYER OF A HYDRAULIC HOSE, HYDRAULIC HOSE, AND METHOD FOR PRODUCING THE HYDRAULIC HOSE

(71) Applicant: Eaton Intelligent Power Limited, Dublin (IE)

(72) Inventors: Recep Muco, Corlu (TR); Muslum Eren, Cerkezkoy (TR); Volkan Karayazi, Cerkezkoy (TR); Tekin Coskun, Cerkezkoy (TR); Ozgur Caliskan, Cerkezkoy (TR)

(73) Assignee: DANFOSS POWER SOLUTIONS II TECHNOLOGY A/S, Nordborg (DK)

( * ) Notice: Subject to any disclaimer, the term of this patent is extended or adjusted under 35 U.S.C. 154(b) by 47 days.

(21) Appl. No.: 16/955,807

(22) PCT Filed: Dec. 20, 2018

(86) PCT No.: PCT/EP2018/086435
§ 371 (c)(1),
(2) Date: Jun. 19, 2020

(87) PCT Pub. No.: WO2019/122264
PCT Pub. Date: Jun. 27, 2019

(65) Prior Publication Data
US 2020/0340603 A1    Oct. 29, 2020

(30) Foreign Application Priority Data
Dec. 22, 2017  (GB) ..................... 1721787

(51) Int. Cl.
*F16L 11/08*    (2006.01)
*B61C 17/00*    (2006.01)
(Continued)

(52) U.S. Cl.
CPC ............ *F16L 11/088* (2013.01); *B61C 17/00* (2013.01); *C08L 31/04* (2013.01); *F16L 11/081* (2013.01);
(Continued)

(58) Field of Classification Search
CPC ........ F16L 11/088; F16L 11/081; F16L 11/12; F16L 59/143; F16L 59/153; B61C 17/00;
(Continued)

(56) References Cited

U.S. PATENT DOCUMENTS 10,894,878 B2 *  1/2021  Muco .................. C08L 23/0853
2006/0270783 A1  11/2006  Beck
(Continued)

FOREIGN PATENT DOCUMENTS

CN    102617941 A    8/2012
CN    106750860 A    5/2017
(Continued)

*Primary Examiner* — Frances Tischler
(74) *Attorney, Agent, or Firm* — Leydig, Voit & Mayer, Ltd.

(57) ABSTRACT

A rubber composition for a cover layer of a hydraulic hose includes: ethylene vinyl acetate copolymer (EVA); and ethylene-propylene-diene terpolymer (EPDM). In an embodiment, the composition includes ethylene vinyl acetate copolymer (EVA) and ethylene-propylene-diene terpolymer (EPDM) and additives. The additives may include carbon black with a content of around 15 phr, silica with a content of around 20 phr, di-octyl adipate with a content of around 18 phr, aluminium hydroxide with a content of around 124 phr, magnesium hydroxide with a content of around 30 phr, and other chemicals with a content of around 20 phr. The other chemicals may include zinc oxide, peroxide curative, antioxidant, coagents and processing aids.

15 Claims, 8 Drawing Sheets

(51) Int. Cl.
  *C08L 31/04* (2006.01)
  *F16L 11/12* (2006.01)
  *F16L 59/14* (2006.01)
  *F16L 59/153* (2006.01)

(52) U.S. Cl.
  CPC ............. *F16L 11/12* (2013.01); *F16L 59/143* (2013.01); *F16L 59/153* (2013.01); *C08L 2201/08* (2013.01); *C08L 2205/025* (2013.01)

(58) Field of Classification Search
  CPC ................ C08L 31/04; C08L 2201/08; C08L 2205/025; C08L 23/16; C08L 23/0853; F61L 11/081; F61L 11/12; F61L 59/143; F61L 59/153; F61L 11/088; C08K 2003/2224; C08K 2003/2227; C08K 3/04; C08K 3/22; C08K 5/092; C08K 5/11
  USPC ....................................................... 252/609
  See application file for complete search history.

(56) References Cited

U.S. PATENT DOCUMENTS

| | | |
|---|---|---|
| 2008/0083468 A1 | 4/2008 | Barnhouse et al. |
| 2010/0183371 A1 | 7/2010 | Witz |
| 2018/0051157 A1* | 2/2018 | Mestan .................. C08L 23/16 |

FOREIGN PATENT DOCUMENTS

| | | | |
|---|---|---|---|
| EP | 605843 A1 * | 7/1994 | ......... C08L 23/0853 |
| GB | 1378444 A | 12/1974 | |
| GB | 2545440 A1 | 6/2017 | |
| WO | WO 2016149729 A1 | 9/2016 | |

* cited by examiner

RUBBER COMPOSITION FOR A COVER LAYER OF A HYDRAULIC HOSE, HYDRAULIC HOSE, AND METHOD FOR PRODUCING THE HYDRAULIC HOSE

CROSS-REFERENCE TO PRIOR APPLICATIONS

This application is a U.S. National Phase application under 35 U.S.C. § 371 of International Application No. PCT/EP2018/086435, filed on Dec. 20, 2018, and claims benefit to British Patent Application No. GB 1721787.8, filed on Dec. 22, 2017. The International Application was published in English on Jun. 27, 2019 as WO 2019/122264 under PCT Article 21(2).

FIELD

A rubber composition for a cover layer of a hydraulic hose, a hydraulic hose and a method for producing the hydraulic hose are provided.

BACKGROUND

Rubber hoses which are used for railway application have to undergo fire tests as the most critical and important tests. In the past German DIN 5510 norm was the best-known test method for fire tests applied on railway hoses. Since the introduction of EN 45545-2 fire test norm in 2013 (EN 45545-2:2013), railway hoses compatible with EN 45545-2:2013 fire test requirements are required. EN 45545-2:2013 norm covers three different fire test methods, these are: EN ISO 4589-2, i.e. the determination of the minimum oxygen index at which the hose material will begin to burn, NF X 70-100-1/-2, i.e. the determination of the smoke toxicity, and EN ISO 5659-2, i.e. the determination of the optical density of smoke. Compared to other fire test methods EN 45545-2:2013 norm requires the most severe fire test conditions on rubber hose samples.

SUMMARY

In an embodiment, the present invention provides a rubber composition for a cover layer of a hydraulic hose, comprising: ethylene vinyl acetate copolymer (EVA); and ethylene-propylene-diene terpolymer (EPDM).

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
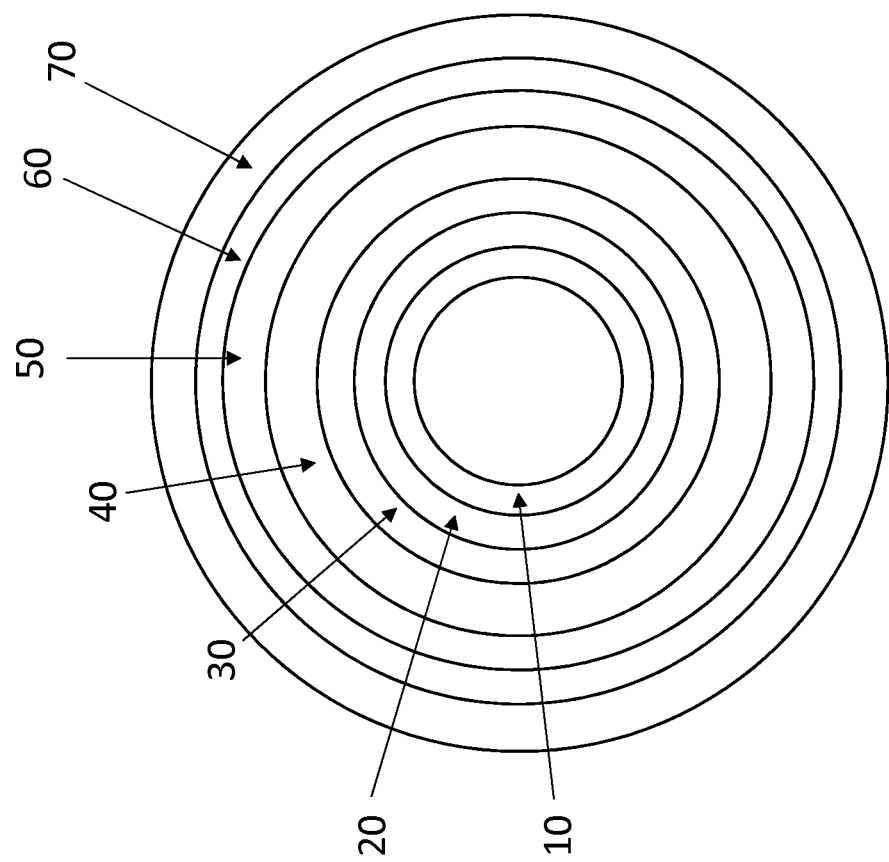
FIG. 1A shows a schematic sectional view of an exemplary hydraulic hose.

Embodiments of the present invention provide a rubber composition for a cover layer of a hydraulic hose with improved properties, a hydraulic hose with such a cover layer with improved properties, and a method for producing the hydraulic hose.

A rubber composition for a cover layer of a hydraulic hose is provided comprising ethylene vinyl acetate copolymer (EVA) and ethylene-propylene-diene terpolymer (EPDM).

The expression "for a cover layer of a hydraulic hose" means that the rubber composition is adapted to form a cover layer of a hydraulic hose, in particular a wire inserted textile cord reinforced hydraulic oil suction hose. The cover layer of a hydraulic hose is the outermost layer of the hose. Being adapted to form a cover layer of a hydraulic hose means that a hydraulic hose having a cover layer of this rubber composition fulfils all important requirements for railway application, for example the EN 45545-2:2013 requirements, and, additionally, the requirements of SAE J517 100R4 hydraulic hose standard.

Therefore the rubber composition is highly flame-retardant as it is based on an elastomeric blend of EVA and EPDM. The rubber composition emits a remarkably small volume of smoke density, generates almost no toxic gases when burning and requires a very high oxygen volume for burning even when it is set on fire. Additionally, the rubber composition remains flexible even after a flexibility test at −40° C. Such a flexibility test can conform to the measurement of flexibility and stiffness according to ISO 10619-2 where bending tests at sub-ambient temperatures are conducted. Furthermore, a cover layer made of such a rubber composition is ozone-, UV- and weather-resistant.

According to an embodiment the EPDM comprises a content of ethylene of 30 to 55 wt %, a content of propylene of 40 to 70 wt % and a content of diene of 3 to 7 wt %. For example, the content of ethylene is 51 wt %, the content of propylene is 44.7 wt % and the content of diene is 4.3 wt %. The molecular weight distribution can be controlled long chain branching (CLCB).

According to another embodiment the EVA comprises a content of ethylene of 40 wt % and a content of vinyl acetate of 60 wt %.

According to another embodiment the rubber composition for the cover layer is halogen-free. As both, EVA and EPDM, are halogen-free polymers they do not generate any halogen-containing gas after burning. This is especially advantageous for human health and the environment.

According to another embodiment the content of EVA in the rubber composition is chosen from 60 phr to 65 phr (phr: per hundred rubber) and the content of EPDM is chosen from 40 phr to 35 phr. For example, the content of EVA is 60 phr and the content of EPDM is 40 phr. These are the optimum values for having a rubber composition for a cover layer of a hydraulic hose, in particular a hydraulic oil suction hose, that fulfils the flexibility test at −40° C. according to the SAE J517 100R4 norm for hydraulic oil suction hoses.

According to another embodiment the rubber composition further comprises at least one of carbon black, silica, di-octyl adipate, aluminium hydroxide, and magnesium hydroxide. For example the rubber composition comprises all of carbon black, silica, di-octyl adipate, aluminium hydroxide, and magnesium hydroxide. Aluminium hydroxide and magnesium hydroxide are halogen-free flame-retardant agents. The aluminium hydroxide may be fine-precipitated and the magnesium hydroxide may be chosen from a high purity grade magnesium hydroxide.

If a halogen-containing rubber polymer is compounded with a large amount of halogen-containing flame retardant it is very disadvantageous from the standpoint of safety, health of human beings and environmental pollution when it is set on fire because combustion of such a rubber composition necessarily produces a large volume of toxic or corrosive gases as well as a large volume of smoke. These disadvantages can be prevented or highly reduced by using the halogen-free and low smoke generating polymers EVA and EPDM as well as halogen-free flame retardants like aluminium hydroxide and magnesium hydroxide.

The amounts of the additives may be chosen such that the content of carbon black is around 15 phr, the content of silica is around 20 phr, the content of di-octyl adipate is around 18 phr, the content of aluminium hydroxide is around 124 phr, the content of magnesium hydroxide is around 30 phr, and the content of other chemicals may be around 20 phr. Other chemicals may be further comprised in the rubber composition, for example, zinc oxide, peroxide curative, antioxidant, co-agents and processing aids.

Another aspect refers to a hydraulic hose, for example a hydraulic oil suction hose. The hydraulic hose comprises a tube, a first reinforcement layer on the tube, a helical wire reinforcement on the first reinforcement layer, a first insulation layer on the helical wire reinforcement layer, a second reinforcement layer on the first insulation layer, a second insulation layer on the second reinforcement layer and a cover layer on the second insulation layer, wherein the cover layer comprises a rubber composition according to one of the above mentioned embodiments. The cover layer may consist of a rubber composition according to one of the above mentioned embodiments. Thus, all features mentioned with respect to the rubber composition for the cover layer are also valid for the hydraulic hose and vice versa.

The first and second reinforcement layers are according to an embodiment textile cord reinforcement layers.

"on" in this context is to be understood that the tube is the innermost layer, the first reinforcement layer is applied on the outer surface of the tube, the helical wire reinforcement is applied on the outer surface of first reinforcement layer, the first insulation layer is applied on the outer surface of helical wire reinforcement, the second reinforcement layer is applied on the outer surface of the first insulation layer, the second insulation layer is applied on the surface of second reinforcement layer and the cover layer being the outermost layer is applied on the outer surface of the second insulation layer. "Applied on" means that there is a direct or indirect mechanical contact area between the tube and the first reinforcement layer, the first reinforcement layer and helical wire reinforcement, the helical wire reinforcement and the first insulation layer, the first insulation layer and the second reinforcement layer, the second reinforcement layer and the second insulation layer, and the second insulation layer and the cover layer. In case of an indirect mechanical contact area there might be applied one or more additional layers between the respective layers.

The size of the hydraulic hose, that is the diameter of the hydraulic hose, depends on its application in the railway. The inner diameter, that is the diameter of the inner surface of the tube may be, for example, 19 mm or 32 mm, the outer diameter, that is the diameter of the outer surface of the cover layer may be 32.6 mm or 46 mm, for example. The thickness of the wall of the hose, that is the thickness of all layers together might be, for example, 6.8 mm or 7 mm. The hydraulic hose may be used in railway applications as it fulfils the EN 45545-2: 2013 norm requirements and the SAE J517 100R4 hydraulic rubber hose norm.

Additionally, other diameters and wall thicknesses according to the hydraulic hose standard SAE J517 100R4 can be chosen as well. Thus, the inner diameter (minimum value) can be chosen from the range of 18.2 mm to 100 mm and the outer diameter (maximum value) can be chosen from the range of 34.9 mm to 120.7 mm. Following sizes are according to SAE J517 100R4 standard possible:

| Metric size (1) | Metric size (2) | Inner diameter minimum [mm] | Inner diameter maximum [mm] | Outer diameter maximum [mm] | Bend pressure [MPa] | Radius [mm] |
|---|---|---|---|---|---|---|
| 19 | −12 | 18.2 | 19.8 | 34.9 | 2.1 | 125 |
| 25 | −16 | 24.6 | 26.2 | 41.3 | 1.7 | 150 |
| 31.5 | −20 | 30.6 | 33.0 | 50.8 | 1.4 | 200 |
| 38 | −24 | 36.9 | 39.3 | 57.2 | 1.05 | 255 |
| 51 | −32 | 49.2 | 52.4 | 69.9 | 0.7 | 300 |
| 63 | −40 | 61.9 | 65.1 | 82.6 | 0.4 | 355 |
| 76 | −48 | 74.6 | 77.8 | 95.3 | 0.4 | 460 |
| 89 | −56 | 87.3 | 90.5 | 107.9 | 0.3 | 530 |
| 102 | −64 | 100.0 | 103.2 | 120.7 | 0.25 | 610 |

According to another embodiment the tube of the hydraulic hose comprises a material being halogen-free. Therefore, also the tube material does not generate any halogen-containing gas after burning.

According to another embodiment the material of the tube comprises an acrylonitrile butadiene rubber (NBR). The amount of the NBR may be 100 phr. Alternatively, the tube comprises a blend of styrene butadiene rubber (SBR) and acrylonitrile butadiene rubber (NBR).

According to another embodiment the NBR comprises a content of acrylonitrile of less than 30 wt %, for example 28 wt %. This is a reduced amount of acrylonitrile in the NBR leading to an improved flexibility after the cold flexibility test at −40° C. This is important to fulfil the requirements of the SAE J517 100R4 hydraulic rubber hose norm. Thus, the hydraulic hose has a good resistance with respect to cold temperature due to the materials for the tube and the cover layer.

According to another embodiment the hydraulic hose comprises a tube material further comprising at least one of carbon black, silica, kaolin, di-octyl adipate, aluminium hydroxide, and magnesium hydroxide. According to one embodiment the tube material comprises all of carbon black, silica, kaolin, dip-octyl adipate, aluminium hydroxide, and magnesium hydroxide. Thus the halogen-free NBR is compounded with the halogen-free flame retardant aluminium hydroxide and magnesium hydroxide.

The amount of the additives may be chosen such that carbon black is added to the NBR with an amount of around 15 phr, silica with an amount of around 20 phr, kaolin with an amount of around 15 phr, di-octyl adipate with an amount of around 9 phr, aluminium hydroxide with an amount of around 100 phr, magnesium hydroxide with an amount of around 38 phr, and other chemicals like zinc oxide, peroxide curative, antioxidant, co-agents and processing aids with an amount of around 35 phr. The aluminium hydroxide may be fine precipitated and the magnesium hydroxide may have a high purity grade.

According to an embodiment the first and/or second reinforcement layer comprises a polyester fabric. Furthermore the first and/or second insulation layer may comprise at least one of styrene butadiene rubber (SBR), acrylonitrile butadiene rubber (NBR) and chloroprene rubber (CR). For example, the first and/or second insulation layer may comprise a poly blend of SBR, NBR and CR. According to another embodiment the helical wire reinforcement comprises steel wire.

Further, a method for producing a hydraulic hose according to the above mentioned embodiments is provided. The method comprises the steps:
providing calendared uncured materials of the rubber composition for the cover layer and of the tube,
providing a steel mandrel,
wrapping the uncured material of the tube on the mandrel,
wrapping a first reinforcement layer on the uncured material of the tube,
forming a helical wire reinforcement on the first reinforcement layer,
wrapping a first insulation layer on the helical wire reinforcement,
a second reinforcement layer on the first insulation layer, and a second insulation layer on the second reinforcement layer,
wrapping the uncured material of the rubber composition for the cover layer on the second insulation layer, and
curing the wrapped layers.

With this method a hydraulic hose according to the above mentioned embodiments may be produced. Thus, all features mentioned with respect to the hydraulic hose apply also for the method and vice versa.

The mandrel is according to one embodiment made of rigid steel and may rotate in one direction.

According to one embodiment the wrapping of the uncured materials of the rubber composition and the tube takes place under strain. Thus, the resistance of the uncured materials against tearing when the materials are stretched, i. e. the green strength, is a key criteria of the uncured materials which is fulfilled by the materials for the tube and the cover layer as described here.

The green strength of the uncured materials of the rubber composition for the cover layer and of the tube can be tested by laboratory scaling studies with a tensiometer.

The uncured materials of the rubber composition for the cover layer and of the tube may be wrapped as multilayers.

The curing may take place in a saturated steam atmosphere, for example in an autoclave. The curing may be performed for example for 90 minutes and at 4 bar steam pressure at a temperature of 152° C.

After curing, the hydraulic hose may be removed or ejected from the mandrel.

According to an embodiment, before curing there is a polyamide bandage wrapped on the outer surface of the cover layer, i.e. on the wrapped layers.

In the examples and figures, like parts are designated by like numerals. The depicted parts and their proportions are not to scale, rather some parts as for example layers may be depicted exaggerated large in order to improve the presentability.

Figure 1B:
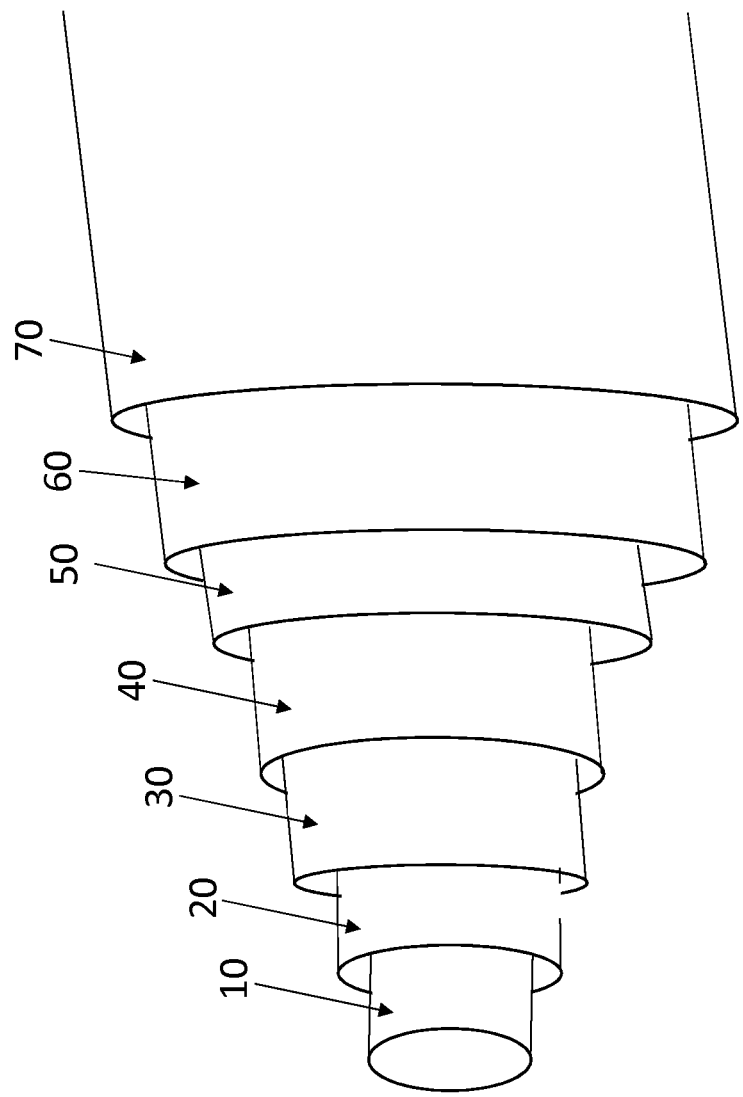
FIG. 1B shows a schematic perspective view of the hydraulic hose.

With respect to FIGS. 1A and 1B, the tube 10 is shown as the innermost layer of the hydraulic hose, the first reinforcement layer 20 applied on the tube 10, the helical wire reinforcement 30 applied on the first reinforcement layer 20, the first insulation layer 40 applied on the helical wire reinforcement 30, the second reinforcement layer 50 applied on the first insulation layer 40, the second insulation layer 60 applied on the second reinforcement layer 50 and the cover layer 70 applied on the second insulation layer 60 are shown as well, in a schematic sectional view (FIG. 1A) and a schematic perspective view (FIG. 1B). The hydraulic hose is an oil suction hose.

The first and second reinforcement layers 20, 50 may be textile cord reinforcement layers and comprise polyester fabric, the first and second insulation layer 40, 60 comprise at least one of styrene butadiene rubber (SBR), acrylonitrile butadiene rubber (NBR) and chloroprene rubber (CR), preferably SBR, NBR and CR in form of a poly-blend, the helical wire reinforcement 30 comprises a spring steel wire. The compositions for the tube 10 and the cover 70 are given in Table 1.

TABLE 1

| Ingredients | Tube layer [phr] | Cover layer [phr] |
| --- | --- | --- |
| NBR | 100 | |
| EVA | | 60 |
| EPDM | | 40 |
| Carbon black | 15 | 15 |
| Silica | 20 | 20 |
| Kaolin | 15 | |
| Di-octyl adipate | 9 | 18 |
| Fine-precipitated aluminium hydroxide | 100 | 124 |
| High purity grade of magnesium hydroxide | 38 | 30 |
| Other | 35 | 20 |

The other chemicals include, for example zinc oxide, peroxide curative, antioxidant, co-agents and processing aids. The NBR has a content of acrylonitrile of 28 wt %. The EPDM has a content of ethylene of 51 wt %, of propylene of 44.7 wt % and of diene of 4.3 wt %. The EVA has a content of ethylene of 40 wt % and a content of vinyl acetate of 60 wt %.

Hydraulic oil suction hoses were made from a material for the tube 10 and a rubber composition for the cover layer 70 according to Table 1 according to the following procedure. An uncured material for the tube 10 is wrapped as multilayer on a rigid steel mandrel which is rotating in one direction. The first reinforcement layer 20, the helical wire reinforcement 30, the first insulation layer 40, the second reinforcement layer 50 and the second insulation layer 60 are wrapped on the uncured material for the tube 10. The uncured material for the rubber composition for the cover layer 70 is wrapped as multilayer on the second insulation layer 60. A polyamide bandage is wrapped on the layer sequence. The layer sequence is cured in saturated steam in an autoclave for 90 minutes at 3.2 bar steam pressure at 145° C. Afterwards, the hydraulic hose is ejected from the steel mandrel.

Two examples of hydraulic oil suction hoses with tube and cover materials according to table 1 were made for fire testing according to EN 45545-2:2013. For each test several pieces of a hydraulic oil suction hose of example 1 and of example 2 were tested and the mean value of the results was calculated.

According to example 1, the weight of the NBR for the tube 10 is 200 g/m$^2$, the weight of the polyester fabric for the first and second reinforcement layer 20, 50 is 150 g/m$^2$, the weight of the SBR for the first and second insulation layer 40, 60 is 120 g/m$^2$, the weight of the steel wire for the helical wire reinforcement 30 is 77 g/m$^2$ and the weight of the rubber composition for the cover layer 70 is 286 g/m$^2$. The diameter of the inner surface of the tube 10 is 19 mm, the diameter of the outer surface of the cover layer 70 is 32.6 mm, the wall thickness of the hose is 6.8 mm and the overall nominal weight is 833 g/m$^2$.

According to example 2 the weight of the material of the tube 10 is 334 g/m$^2$, the weight of the polyester fabric for the first and second reinforcement layer 20, 50 is 231 g/m$^2$, the weight of the SBR for the first and second insulation layer 40, 60 is 215 g/m$^2$, the weight of the steel wire of the helical wire reinforcement 30 is 103 g/m², and the weight of the rubber composition of the cover layer 70 is 412 g/m². The diameter of the inner surface of the tube 10 is 32 mm, the diameter of the outer surface of the cover layer 70 is 46 mm, the wall thickness of the hose is 7 mm and the overall nominal weight of the hose is 1295 g/m².

Several pieces of both examples were subjected to tests according to EN 45545-2:2013. The minimum oxygen index at which the hose material begins to burn is determined in accordance with the procedure of EN ISO 4589-2. The procedure according to EN ISO 5659-2 is performed to determine the smoke generation, i.e. the optical density, by a single chamber test, and the procedure of NF X 70-100-1/-2 is performed to determine the dimensionless toxicity index $CIT_{NLP}$ (at a test temperature of 600° C. and with samples each having a total mass of 1 gram). The test conditions are applied for materials requiring the R22 (application of the hose inside the railway) and R23 (application of the hose outside of the railway) conditions.

The results of the mentioned tests are summarized in Table 2.

TABLE 2

| Test | EN ISO 4589-2 | EN ISO 5659-2 | NF X 70-100-1/-2 | | | |
|---|---|---|---|---|---|---|
| Parameter | LOI (%) | $DS_{max}$ (25 kW/m²-flaming | | $CIT_{NLP}$ | | |
| Results example 1 | 32.1 | 284 | | 0.11 | | |
| Results example 2 | 33.0 | 189 | | 0.12 | | |
| Acceptance limits | for R22-R23 | for R22 | R23 | for R22 | | R23 |
| | HL1: ≥28% | HL1: ≤600 | HL1: — | HL1: ≤1.2 | | HL1: — |
| | HL2: ≥28% | HL2: ≤300 | HL2: ≤600 | HL2: ≤0.9 | | HL2: ≤1.8 |
| | HL3: ≥32% | HL3: ≤150 | HL3: ≤300 | HL3: ≤0.75 | | HL3: ≤1.5 |

LOI is the limiting oxygen index, $CIT_{NLP}$ refers to the critical index of toxicity (which is determined by summing up the measured concentrations of the gas components $CO_2$, CO, HF, HCl, HBr, HCN, $SO_2$, and $NO_x$). The maximal smoke density $DS_{max}$ corresponds to an irradiance of 25 kW/m² with a pilot flame.

As can be seen from Table 2 the requirements for the application of the hydraulic hose inside the railway (R22) and outside of the railway (R23) are fulfilled for examples 1 and 2. Thus, the hydraulic hose according to the examples meet the HL1-HL2 levels (HL: hazard level) for R22 requirements according to EN 45545-2:2013 standard for internal usage and the HL1-HL2-HL3 levels for R23 requirements according to EN 45545-2:2013 standard for outside usage.

Figure 2A:
FIGS. 2 to 7 show pictures of exemplary samples before and after fire tests.
Figure 2B:
Figure 3B:
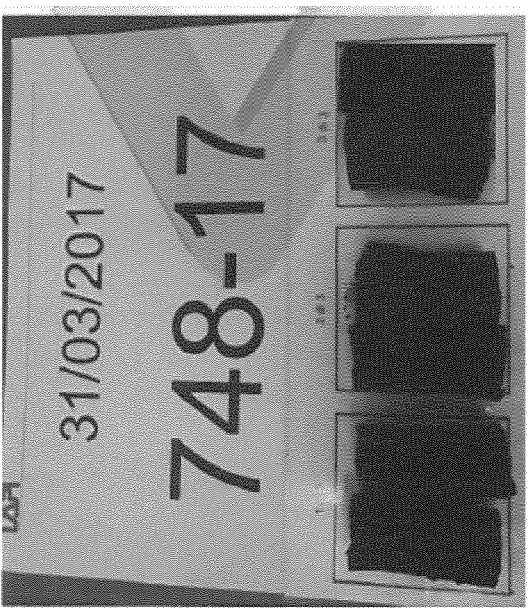
Figure 3A:
Figure 4B:
Figure 4A:
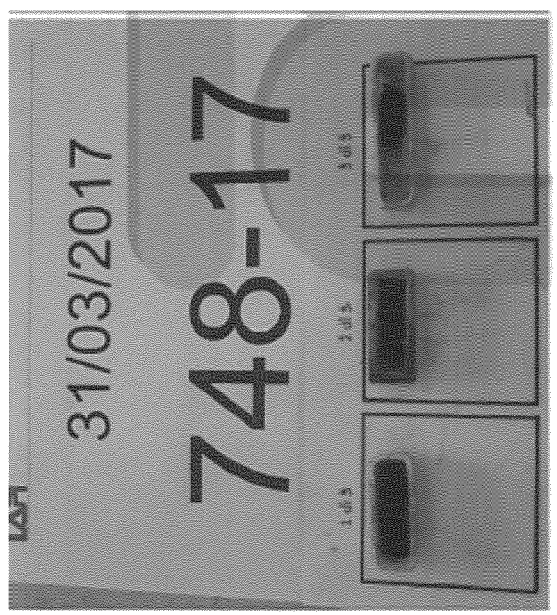
Figure 5B:
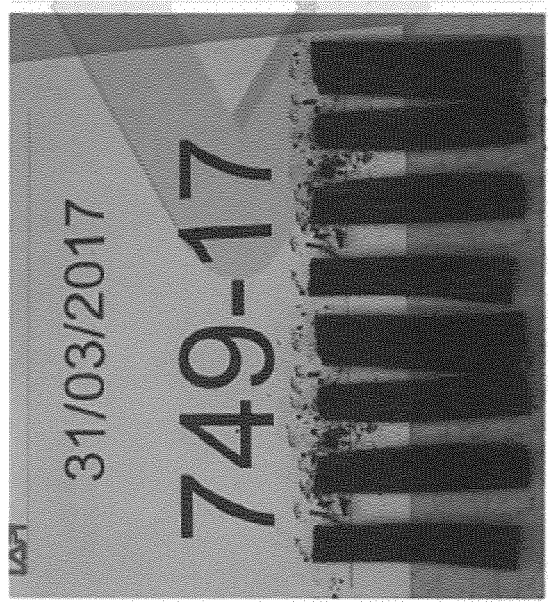
Figure 5A:
Figure 6B:
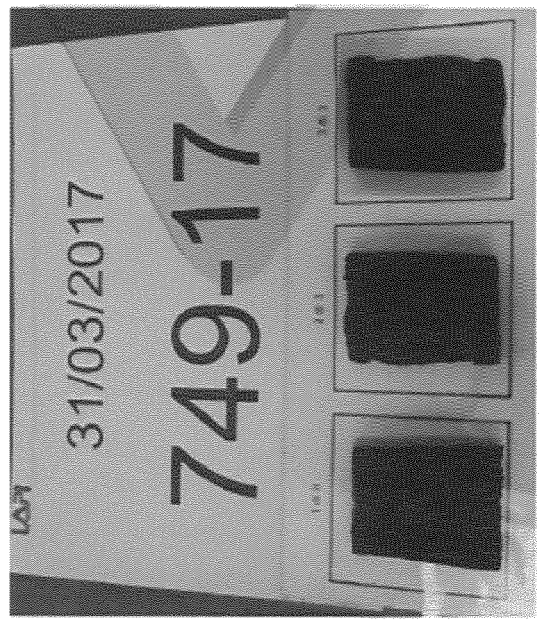
Figure 6A:
Figure 7B:
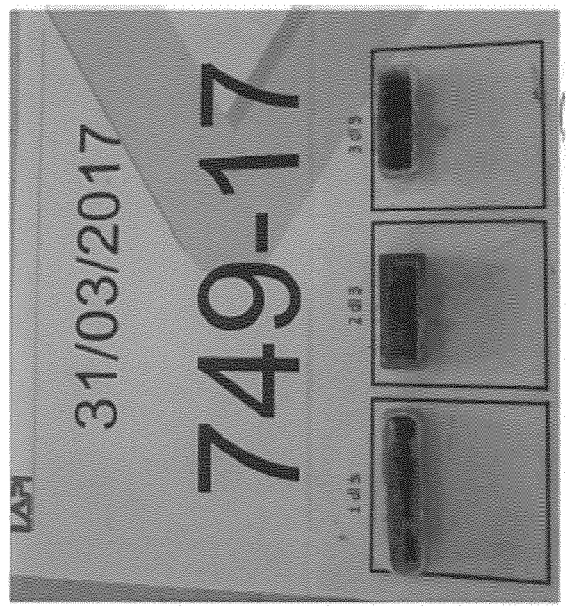
Figure 7A:
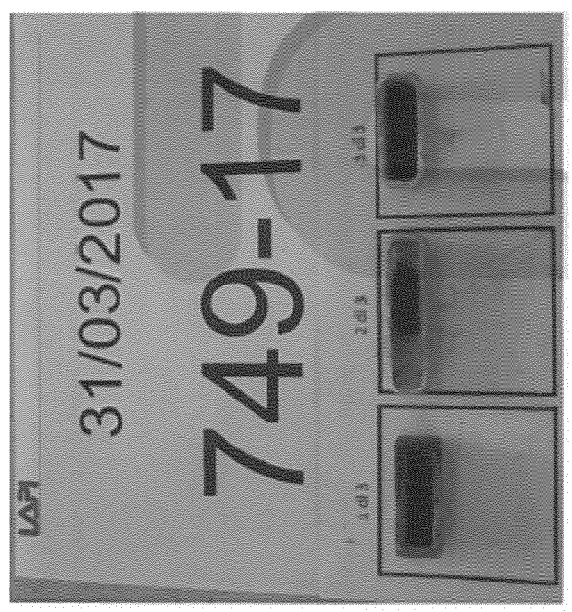

FIGS. 2 to 7 show pictures of the samples before and after the respective tests. FIGS. 2A, 3A and 4A refer to example 1 before the tests, FIGS. 2B, 3B, 4B refer to example 1 after the tests. FIGS. 5A, 6A, 7A refer to example 2 before the tests and FIGS. 5B, 6B, 7B refer to example 2 after the tests. FIGS. 2 and 5 show pictures of the samples before and after the test according to EN ISO 4589-2, FIGS. 3 and 6 show pictures of the samples before and after the test according to EN ISO 5659-2 and FIGS. 4 and 7 show pictures of the samples before and after the test according to NF X 70-100-1/-2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A rubber composition for a cover layer of a hydraulic hose, comprising:
   ethylene vinyl acetate copolymer (EVA); and
   ethylene-propylene-diene terpolymer (EPDM) and additives;
   wherein the EPDM comprises a content of ethylene of 51 wt %, a content of propylene of 44.7 wt %, and a content of diene of 4.3 wt %, and
   wherein the additives comprise carbon black with a content of around 15 phr, silica with a content of around 20 phr, di-octyl adipate with a content of around 18 phr, aluminium hydroxide with a content of around 124 phr, magnesium hydroxide with a content of around 30 phr, and other chemicals with a content of around 20 phr, and
   wherein the other chemicals comprise zinc oxide, peroxide curative, antioxidant, coagents and processing aids.

2. The rubber composition according to claim 1, wherein the EVA comprises a content of ethylene of 40 wt % and a content of vinyl acetate of 60 wt %.

3. The rubber composition according to claim 1, wherein the composition is halogen-free.

4. The rubber composition according to claim 1, wherein a content of EVA is from 60 phr to 65 phr and a content of EPDM is from 40 phr to 35 phr.

5. A hydraulic hose, comprising:
a tube;
a first reinforcement layer directly applied on the tube;
a helical wire reinforcement directly applied on the first reinforcement layer;
a first insulation layer directly applied on the helical wire reinforcement;
a second reinforcement layer directly applied on the first insulation layer;
a second insulation layer directly applied on the second reinforcement layer; and
a cover layer directly applied on the second insulation layer,
wherein the cover layer comprises a rubber composition comprising ethylene vinyl acetate copolymer (EVA) and ethylene-propylene-diene terpolymer (EPDM) and additives;
wherein the EPDM comprises a content of ethylene of 51 wt %, a content of propylene of 44.7 wt %, and a content of diene of 4.3 wt %;
wherein the additives comprise carbon black with a content of around 15 phr, silica with a content of around 20 phr, di-octyl adipate with a content of around 18 phr, aluminium hydroxide with a content of around 124 phr, magnesium hydroxide with a content of around 30 phr, and other chemicals with a content of around 20 phr, and
wherein the other chemicals comprise zinc oxide, peroxide curative, antioxidant, coagents and processing aids.

6. The hydraulic hose according to claim 5, wherein the tube comprises a material being halogen free.

7. The hydraulic hose according to claim 6, wherein the material of the tube comprises an acrylonitrile butadiene rubber (NBR).

8. The hydraulic hose according to claim 7, wherein the acrylonitrile butadiene rubber comprises a content of acrylonitrile of less than 30 wt %.

9. The hydraulic hose according to claim 5, wherein the first and/or second reinforcement layer comprise a polyester fabric.

10. The hydraulic hose according to claim 5, wherein the first and/or second insulation layer comprise at least one of styrene butadiene rubber (SBR), acrylonitrile butadiene rubber (NBR), and chloroprene rubber (CR).

11. The hydraulic hose according to claim 5, wherein the helical wire reinforcement comprises steel wire.

12. A method for producing the hydraulic hose according to claim 5, comprising:
providing calendared uncured materials of the rubber composition for the cover layer and of the tube;
providing a steel mandrel;
wrapping the uncured material of the tube on the mandrel;
wrapping the first reinforcement layer on the uncured material of the tube;
forming the helical wire reinforcement on the first reinforcement layer;
wrapping the first insulation layer on the helical wire reinforcement, the second reinforcement layer on the first insulation layer, and the second insulation layer on the second reinforcement layer;
wrapping the uncured material of the rubber composition for the cover layer on the second insulation layer; and
curing the wrapped layers.

13. The method according to claim 12, wherein there is a direct mechanical contact area between the tube and the first reinforcement layer, the first reinforcement layer and the helical wire reinforcement, the helical wire reinforcement and the first insulation layer, the first insulation layer and the second reinforcement layer, the second reinforcement layer and the second insulation layer, and the second insulation layer and the cover layer.

14. The hydraulic hose according to claim 5, wherein a content of EVA is from 60 phr to 65 phr and a content of EPDM is from 40 phr to 35 phr.

15. The method according to claim 12, wherein a content of EVA is from 60 phr to 65 phr and a content of EPDM is from 40 phr to 35 phr.

* * * * *